Aug. 3, 1943.   J. PETRICH   2,326,104
MULTIDRIVE AIRPLANE
Filed March 26, 1941

INVENTOR
Jerry Petrich
BY
Zoltan Polachek
ATTORNEY

Patented Aug. 3, 1943

2,326,104

UNITED STATES PATENT OFFICE 2,326,104

MULTIDRIVE AIRPLANE

Jerry Petrich, New York, N. Y.

Application March 26, 1941, Serial No. 385,245

6 Claims. (Cl. 244—65)

This invention relates to new and useful improvements in a multi-drive airplane.

The invention proposes an airplane having a motor and a plurality of propellers, and a system by which the motor drives the various propellers.

Still further the invention proposes to so arrange the system that the propellers may be pusher or puller types of propellers.

Still further the invention proposes that the system include a plurality of shafts and pulleys mounted on the shafts, and belts connecting the pulleys.

Another object of the invention resides in a novel arrangement whereby the shafts may be longitudinally moved and adjusted to control the positions of the propellers. It is also proposed that the motor be longitudinally adjustably mounted so that it may be moved when desired to shift the center of gravity of the airplane so that the airplane may be balanced in accordance with the distribution of the load it is carrying.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
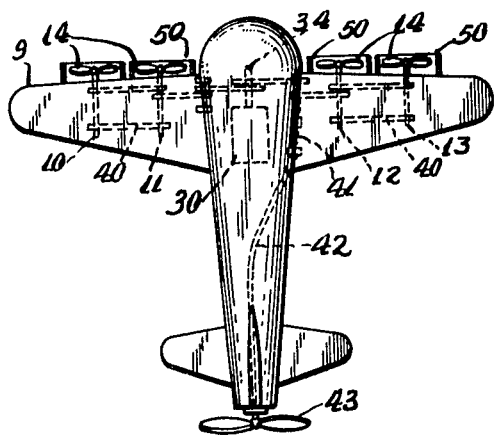
Fig. 1 is a plan view of an airplane with a multi-drive constructed in accordance with this invention.

The multi-drive airplane 9, according to this invention, includes a system of shafts 10, 11, 12, 13, etc. provided with propellers 14. Pulleys 15 are slidably keyed upon the shafts 10, 11, 12 and 13. Means is provided for holding the shafts in various positions in relation to those pulleys. More specifically, each pulley is rotatively supported in a standard 16. Thus the pulleys are stationary, but free to rotate about their axis, while the shafts are slidably mounted through the pulleys.

Each shaft is provided with a bushing 17 which is pinned thereon with a pin 18. Each bushing 17 is rotatively mounted in a collar 19. Each collar 19 has a pair of diametrically opposite projecting pins 20 which engage into slots 21 formed in the sides of a lever 22.

Each lever 22 is pivotally mounted on a bracket 23, at its bottom end. The top end of each lever 22 is provided with a handle 24 by which it may be moved. Latching means is provided for each lever 22 to latch it in a fixed position. This latching means includes a bolt 25 resiliently mounted on each lever and engageable with one of a plurality of apertures 26 formed in an arcuate member 27 which is concentric of the pivot of the lever 22.

A motor 30 is provided with flanges 31 having parallel slots 32 through which holding bolts 33 which are mounted on the airplane 9 pass. Thus the motor 30 may be adjusted along its longitudinal axis since the slots 32 are arranged parallel to the axis. The motor 30 is provided with a shaft 34 which slidably engages through a pulley 35. However, the shaft 34 has a key so as to drive the pulley. The pulley 35 is rotatively mounted in a standard 16. Belts 36 are connected with the pulley 35 and engage over rotatively supported pulleys 37. These pulleys 37 are connected by belts 38 with certain of the pulleys 15 on the said parallel shaft 10, 11, 12 and 13. Other of the pulleys 15 on these shafts are connected together with belts 40.

One of the pulleys 37 is mounted on a shaft 41 which is connected with a flexible drive 42 extending to the rear of the airplane 9. This flexible drive is arrange to drive the rear propeller 43 to cause this propeller to operate to assist in the forward motion of the plane. The shaft 41 is provided with a reversing mechanism 45. The reversing mechanism is so arranged that it may be adjusted to cause the rear portion of the shaft 41 to rotate in a direction opposite to the front portion of the shaft. This causes the rear propeller 43 to rotate in the opposite diresction, and this opposite rotation of the propeller 43 is particularly useful when the plane is being landed as it permits the plane to be landed in a much smaller space or upon a shorter runway than is usually required for large airplanes.

In this form of the invention each of the propellers 14 is provided with an encircling band or ring 50. These rings 50 are mounted on the leading edge of the wings of the airplane 9, and are arranged in a manner to cause all of the air contacted by the propeller to be forced backwards. It thus prevents the air from escaping from the ends of the propeller and greatly increases the speed of the airplane.

The operation of the device is as follows:

When it is desired to vary the center of gravity and the flying characteristics of the airplane 9, it is merely necessary to shift the motor 30 by first loosening the bolts 33. When the motor 30 is in its new position the bolts 33 may be tightened. In all of its positions the shaft 34 will be keyed to the pulley 35 for driving the same. In all positions of the motor 30 it will be connected to drive the various shafts 10, 11, 12, etc. and thus the propellers 14.

When desired the propellers 14 may be moved to various adjusted forward and rearward positions by first opening the bolt 25 of the levers 22 of the shafts and then moving the levers 22 so as to cause the shafts to move forwards or rearwards. In all adjusted positions of the shafts (10, 11, 12 and 13) they still remain keyed to the pulleys 15.

Figure 8:
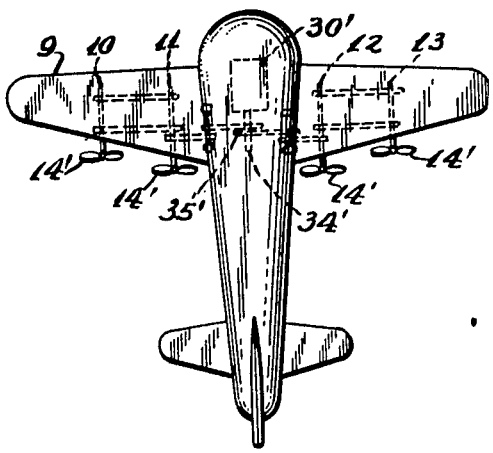
Fig. 8 is a plan view of an airplane provided with a multi-drive constructed in accordance with a modified form of this invention.
Figure 2:
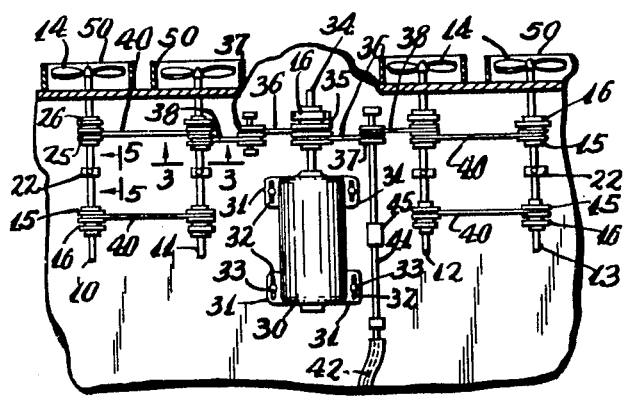
Fig. 2 is a fragmentary horizontal sectional view of a portion of the airplane shown in Fig. 1, particularly showing the shafts and drive system.
Figure 5:
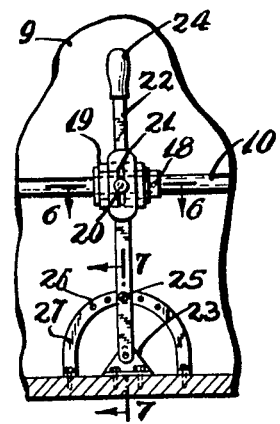
Fig. 5 is a fragmentary elevational view looking in the direction of the line 5—5 of Fig. 2.
Figure 3:
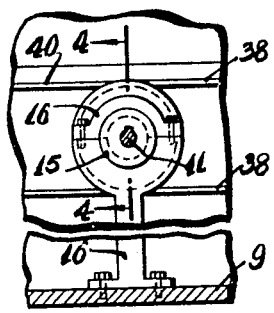
Fig. 3 is a fragmentary vertical sectional view taken on the line 3—3 of Fig. 2.
Figure 7:
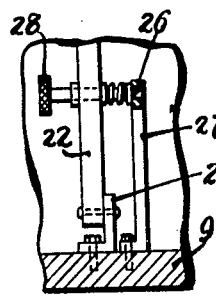
Fig. 7 is a fragmentary vertical sectional view taken on the line 7—7 of Fig. 5.
Figures 4, 6:
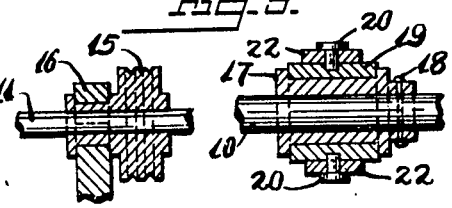
Fig. 4 is a fragmentary vertical sectional view taken on the line 4—4 of Fig. 3.
Fig. 6 is a fragmentary horizontal sectional view taken on the line 6—6 of Fig. 5.

In Fig. 8 a modified form of the invention has been disclosed which is very similar to the prior form, distinguishing merely in the fact that the airplane 9 is provided with pusher propellers 14'. These propellers are mounted on shafts 10, 11, 12 and 13, associated with pulleys and a drive system identically the same way as previously described. The system is provided with a motor 30' having a shaft 34' cooperative with the pulley 35'.

It is believed that the construction and operation of this form of the invention will be readily understood.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an airplane having a propeller shaft slidably extended through an edge portion of its wing and a propeller mounted on the outer end of said shaft means slidably rotatively supporting said propeller shaft within said wing, manually operable means for extending said shaft varying degrees through the edge portion of said wing, and a ring mounted on the edge portion of said wing and encircling the outer ends of said propeller in the normal position of said propeller shaft, whereby said manual means may be operated to extend said propeller shaft and move said propeller out of said ring to a position beyond the leading edge of said ring.

2. In an airplane having a propeller shaft slidably extended through an edge portion of its wing and a propeller mounted on the outer end of said shaft means slidably rotatively supporting said propeller shaft within said wing, manually operable means for extending said shaft varying degrees through the edge portion of said wing, and a ring mounted on the edge portion of said wing and encircling the outer ends of said propeller in the normal position of said propeller shaft, whereby said manual means may be operated to extend said propeller shaft and move said propeller out of said ring to a position beyond the leading edge of said ring, said first means, comprising spaced brackets mounted within said wing, and bushings rotatively supported on the top ends of said brackets, said propeller shaft being keyed to said bushings to slide relative thereto and rotate therewith.

3. In an airplane having a propeller shaft slidably extended through an edge portion of its wing and a propeller mounted on the outer end of said shaft means slidably rotatively supporting said propeller shaft within said wing, manually operable means for extending said shaft varying degrees through the edge portion of said wing, and a ring mounted on the edge portion of said wing and encircling the outer ends of said propeller in the normal position of said propeller shaft, whereby said manual means may be operated to extend said propeller shaft and move said propeller out of said ring to a position beyond the leading edge of said ring, said first means, comprising spaced brackets mounted within said wing, and bushings rotatively supported on the top ends of said brackets, said propeller shaft being keyed to said bushings to slide relative thereto and rotate therewith, said bushings being formed with pulley portions over which belts connected with a source of power extend for rotating said bushings and the propeller shaft.

4. In an airplane having a propeller shaft slidably extended through an edge portion of its wing and a propeller mounted on the outer end of said shaft means slidably rotatively supporting said propeller shaft within said wing, manually operable means for extending said shaft varying degrees through the edge portion of said wing, and a ring mounted on the edge portion of said wing and encircling the outer ends of said propeller in the normal position of said propeller shaft, whereby said manual means may be operated to extend said propeller shaft and move said propeller out of said ring to a position beyond the leading edge of said ring, said manually operable means, comprising a bushing fixedly mounted on an intermediate area of said propeller shaft and having spaced flanges, a collar rotatively mounted on said bushing between said flanges, a lever having an intermediate portion extending along said collar and pivotally mounted to pivot in a plane parallel to the length of said shaft, and means for connecting said collar to said intermediate portion of said lever to move said shaft longitudinally as said lever is pivoted.

5. In an airplane having a propeller shaft slidably extended through an edge portion of its wing and a propeller mounted on the outer end of said shaft means slidably rotatively supporting said propeller shaft within said wing, manually operable means for extending said shaft varying degrees through the edge portion of said wing, and a ring mounted on the edge portion of said wing and encircling the outer ends of said propeller in the normal position of said propeller shaft, whereby said manual means may be operated to extend said propeller shaft and move said propeller out of said ring to a position beyond the leading edge of said ring, said manually operable means, comprising a bushing fixedly mounted on an intermediate area of said propeller shaft and having spaced flanges, a collar rotatively mounted on said bushing between said flanges, a lever having an intermediate portion extending along said collar and pivotally mounted to pivot in a plane parallel to the length of said shaft, and means for connecting said collar to said intermediate portion of said lever to move said shaft longitudinally as said lever is pivoted, said latter means, comprising a pin extending from said collar and slidably engaging an elongated slot formed in said lever.

6. In an airplane having a propeller shaft slidably extended through an edge portion of its wing and a propeller mounted on the outer end of said shaft means slidably rotatively supporting said propeller shaft within said wing, manually operable means for extending said shaft varying degrees through the edge portion of said wing, and a ring mounted on the edge portion of said wing and encircling the outer ends of said propeller in the normal position of said propeller shaft, whereby said manual means may be operated to extend said propeller shaft and move said propeller out of said ring to a position beyond the leading edge of said ring, said manually operable means, comprising a bushing fixedly mounted on an intermediate area of said propeller shaft and having spaced flanges, a collar rotatively mounted on said bushing between said flanges, a lever having an intermediate portion extending along said collar and pivotally mounted to pivot in a plane parallel to the length of said shaft, and means for connecting said collar to said intermediate portion of said lever to move said shaft longitudinally as said lever is pivoted, and means for locking said lever in various pivoted positions to hold said shaft in various longitudinal shifted positions.

JERRY PETRICH.